(No Model.)

J. CHRISTENSEN.
FARM GATE.

No. 358,729. Patented Mar. 1, 1887.

WITNESSES
Samuel E. Thomas
N. S. Wright.

INVENTOR
John Christensen
By W. W. Jeggs
Attorney

UNITED STATES PATENT OFFICE.

JOHN CHRISTENSEN, OF DEXTER, MICHIGAN.

FARM-GATE.

SPECIFICATION forming part of Letters Patent No. 358,729, dated March 1, 1887.

Application filed July 27, 1886. Serial No. 209,248. (No model.)

*To all whom it may concern:*

Be it known that I, JOHN CHRISTENSEN, of Dexter, county of Washtenaw, State of Michigan, have invented a new and useful Improvement in Farm-Gates; and I declare the following to be a full, clear, and exact description of the same, such as will enable others skilled in the art to which it pertains to make and use it, reference being had to the accompanying drawings, which form a part of this specification.

My invention relates to improvements in farm-gates adapted to be raised and lowered in a ready and convenient manner and be retained in any desired position vertically. It is found desirable to have a farm-gate so constructed that it may be lifted so as to swing clear of ice and snow, and so as to permit sheep and swine, when desired, to run under the gate, while it shall at the same time exclude horses or cattle. My improvement is designed to provide such a gate which shall swing easily, and which may be lifted with ease and held in place.

My invention consists, therefore, of the combinations of devices and appliances, hereinafter described, and more particularly pointed out in the claim.

Figure 1:
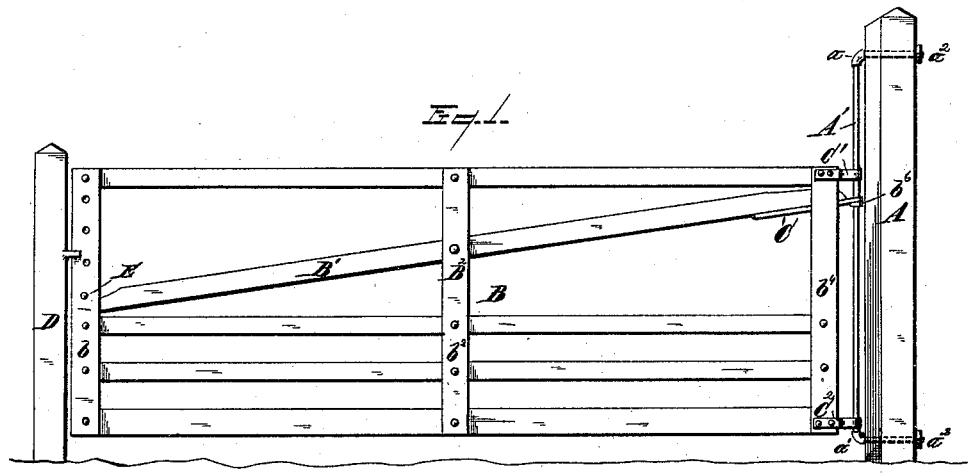
Figure 2:
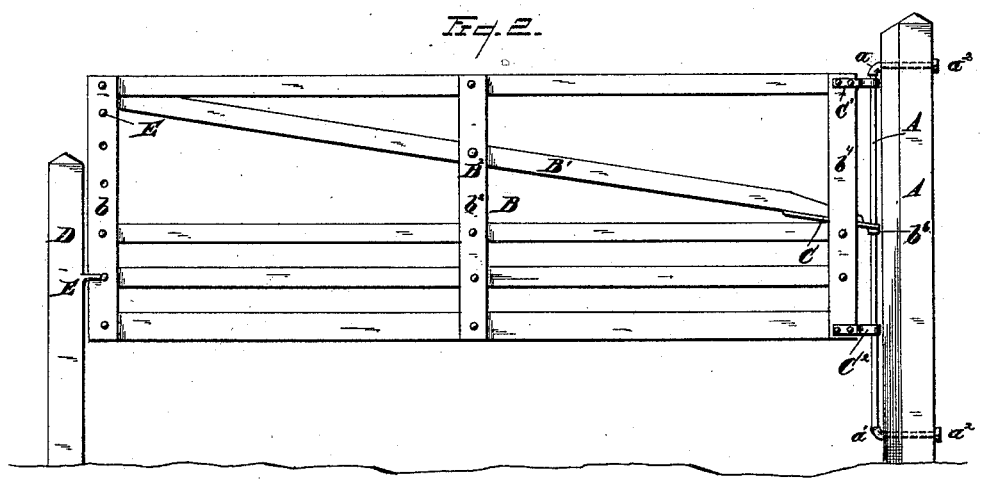
Figure 3:
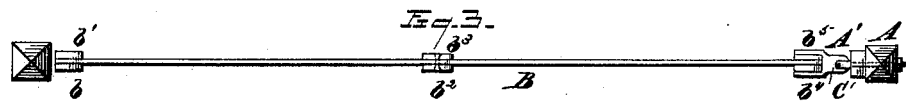

In the drawings, Figure 1 is a side elevation of my improved gate in a lowered position. Fig. 2 is a similar view of my invention, wherein the gate is shown in a raised position. Fig. 3 is a plan view of the same.

I carry out my invention as follows:

A in the drawings represents a post provided with a rod, A'. This rod consists of a piece of gas-pipe, engaged at its ends with ordinary joints, $a\ a'$, passed through the post and held in place by nuts $a^2$. This forms a very economical and efficient method of constructing said rod.

B represents a gate, which may be of any desired construction, except that it is provided with a lever, B', pivotally engaged with the body of the gate intermediate of its ends, as shown at $B^2$. The gate may conveniently be made with uprights $b\ b'\ b^2\ b^3\ b^4\ b^5$, between which the lever is engaged, its two extremities working freely in a vertical direction between the uprights $b\ b'$ and $b^4\ b^5$, while it is pivoted, near its middle, between the uprights $b^2\ b^3$. The rear end of the lever is provided with a strap or eye, C, loosely sleeved upon the rod A' in such a way as to be capable of both a horizontal and a vertical movement on said rod. The gate is also provided with any suitable loop, eye, or hinge at the top and bottom and engaged upon the rod A', as shown at $C'\ C^2$. The rod A' is provided with a stop, boss, or stationary nut, $b^6$, upon which the eye C rests, so as to hold the rear of the lever in a desired position on the said rod. The forward end of the gate may be fastened or latched upon the post D, when closed, in any proper manner.

E represents a pin or other fastening device for holding the forward end of the lever in a desired position.

The operation of the device is as follows: Should it be desired to raise the gate from the position shown in Fig. 1 to the position shown in Fig. 2, the pin or device E is removed and the forward end of the lever is raised, thereby raising the entire gate. The eye C forms, with its engagement upon the boss $b^6$, the fulcrum of the lever, the weight being suspended at the point of the pivotal engagement of the lever with the body of the gate at $B^2$. When the gate is lifted, the pin or other fastening device E is employed to hold the lever in the desired position. The rod A', being continuous and having the gate hinged upon it at top and bottom, affords a firm support for the gate, the engagement of the lever thereupon also adding to the strength and firmness, as it is evident that the lever, when located as shown either in Figs. 1 or 2, forms a very effective brace. It will be observed that as the strap C is sleeved loosely on the rod A' in such a manner as to move freely thereon either in a vertical or horizontal direction, there can be no binding of said strap on the rod when the lever B' is in a horizontal position. The gate, being thus sleeved upon the rod A', is easily operated in swinging, while the gate is kept even as well as firm horizontally.

The gate is pivotally connected with the lever at the middle, so that a limited throw of the forward end of the lever past the center of its pivot is sufficient to raise or lower the gate.

It is noticeable that the working parts of the gate are all confined within the limits of the gate itself, both as respects the height of the gate and its length. It does not require extra bracing. By making the rod A' of gas-pipe engaged at its ends with the gas-pipe joints or elbows $a\,a'$ the joints themselves furnish a stop for the hinges of the gate, while by engaging a gas-pipe in said joints to pass through the post the joint forms also a stop against the wood.

The stop $b^6$ may consist of a nut shrunk upon the pipe, or a gas-pipe joint may be located intermediate the ends of the bar A'—i. e., the bar may be constructed in two parts, united at the middle by a joint, as at $b^6$.

I am aware that swinging gates have heretofore been hinged on continuous rods extending from top to bottom of the gate, and also that such gates have been made vertically adjustable and provided with pivoted lifting-levers arranged in various ways. Such, however, I do not broadly claim.

What I claim is—

The combination, with the post A and the rod A', connected to said post at top and bottom and having a rigid stop, $b^6$, of the gate B, having parallel uprights arranged in pairs, and provided with eyes $C'\,C^2$, having a sliding engagement with said rod, the lever B', pivoted at its middle between the central pair of gate-uprights and provided at its inner end with an eye, C, loosely engaging the rod A' above its stop $b^6$, and the detachable fastening E at the opposite end of said lever, substantially as shown and described.

In testimony whereof I sign this specification in the presence of two witnesses.

JOHN CHRISTENSEN.

Witnesses:
 N. S. WRIGHT,
 JNO. E. WILES.